Jan. 29, 1963
W. H. BENNETT
3,075,861
METHOD AND APPARATUS FOR PRODUCING ELECTRICALLY
CONDUCTING COATINGS ON VITREOUS SUBSTANCES
Filed Oct. 27, 1959
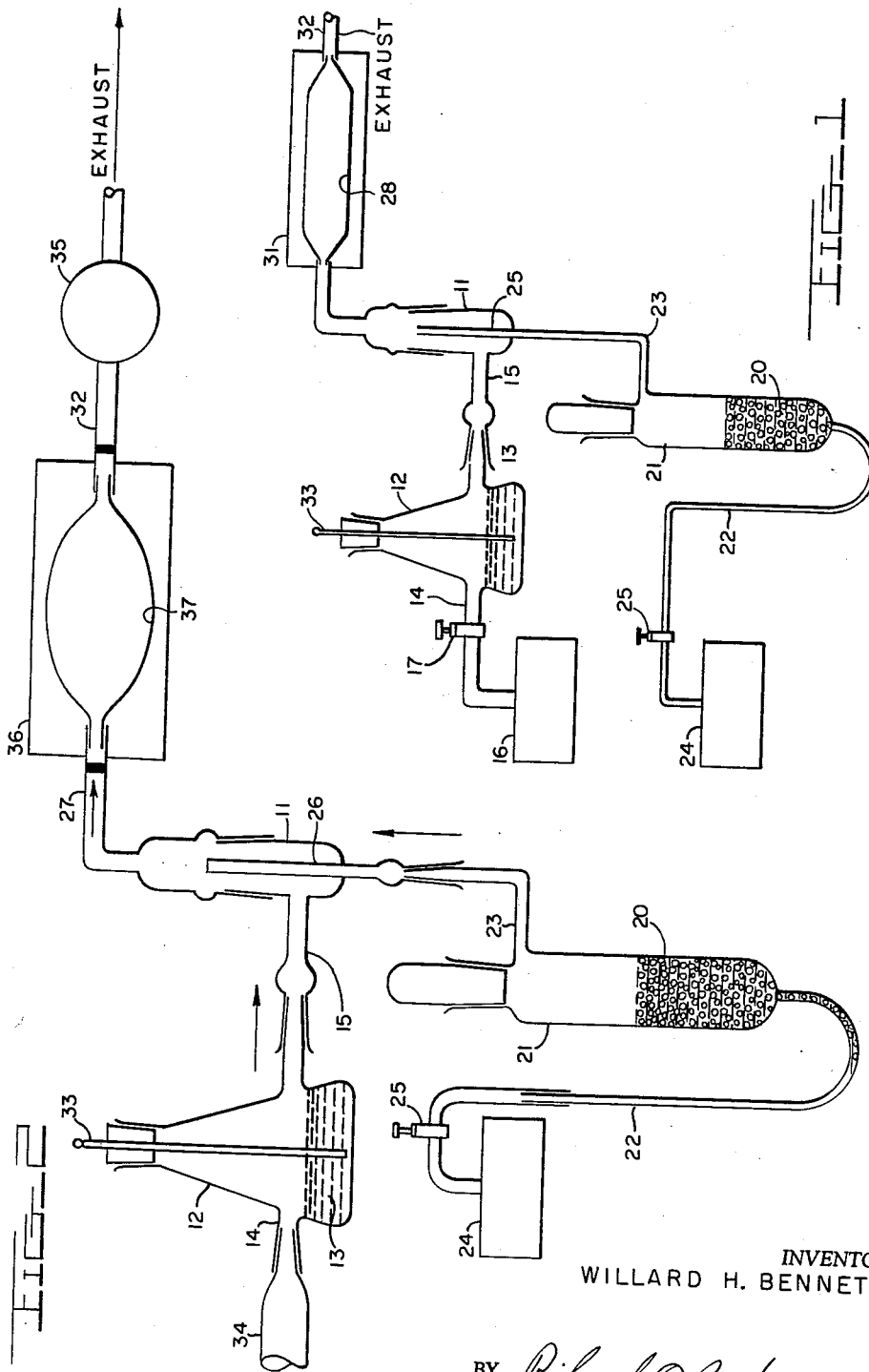
INVENTOR
WILLARD H. BENNETT
BY
ATTORNEY 3,075,861
METHOD AND APPARATUS FOR PRODUCING ELECTRICALLY CONDUCTING COATINGS ON VITREOUS SUBSTANCES
Willard H. Bennett, 174 Chesapeake St. SW., Washington, D.C.
Filed Oct. 27, 1959, Ser. No. 849,121
11 Claims. (Cl. 117—211)
(Granted under Title 35, U.S. Code (1952), sec. 266)

The invention described herein may be manufactured and used by or for the Government of the United States of America for governmental purposes without the payment of any royalties thereon or therefor.

The present invention relates to a method of treating the surface of glass or other vitreous substances to produce thereon an electrically conducting coating or film and more particularly to a method for producing electrically conducting coatings on the inner surface of a glass tube or glass container.

Heretofore various methods have been used for producing electrically conducting coatings on glass and other vitreous substances by the process of spraying, vaporizing, or exploding a wire made of a material to be coated onto a surface. In carrying out these methods conductive films can be obtained by spraying a solution of a metal halide, in alcohol, on the surface of a vitreous substance or on the inner surface of the envelope of a tube while the tube or substance is maintained at a temperature slightly less than the softening point. It has been determined that tubes made up with a glass envelope on which the conductive film has been applied by the above spray method using tin tetrachloride in alcohol as the film forming solution have given unsatisfactory performance. Films heretofore formed by the known processes possess an optical haze and have been found to contain a considerable amount of moisture as is evidenced by a milky, opalescent appearance of the film. These processes also result in mottled or spotted coatings, evidently because the processes do not make use of true aerosols. Heretofore some processes have been used wherein the air used in the spray has been passed through a drying substance in order to remove the moisture therefrom. It has been determined that drying the air is not necessary in producing good conductive films and that better films can be produced by not drying the air.

The method of the present invention overcomes the drawbacks of the prior art coating methods and provides an electrically conducting coating which is photographically clear and which has a uniform thickness having a resistivity in the order of 200 ohms-centimeter/centimeter or less.

In carrying out the method of the present invention an aerosol is formed by the products resulting when vapors of a reducing organic liquid substance such as an alcohol in an air stream and vapors of a liquid metal halide such as antimony pentachloride, antimony pentafluoride, germanium tetrachloride, tin tetrachloride, titanium tetrachloride, and vanadium tetrachloride in another air stream are merged and passed over the surface to be coated at a specific rate. One preferred reducing substance is methyl alcohol and one preferred liquid metal halide is tin tetrachloride. The air employed for the air-alcohol vapor mixture can be either atmospheric or pressurized while the air employed for the liquid metal halide is normally pressurized.

It is therefore an object of the present invention to provide a method for producing clear, uniform, electrically conductive coatings on impervious surfaces of solids.

Another object is to provide a method for producing a clear, evenly coated, electrically conductive film on the inner surface of tubes suitable for forming envelopes of different type tubes.

Still another object is to provide a method for coating a vitreous surface which is simple, inexpensive, and easily operated by inexperienced as well as experienced personnel.

A further object is to provide a device for producing uniform films of uniform resistance throughout the film.

Other and more specific objects of the invention will become apparent upon a careful consideration of the following detailed description when taken together with the accompanying drawing in which:

FIG. 1 illustrates a suitable system for carrying out the method of the present invention.

FIG. 2 is a modification of the system shown by illustration in FIG. 1.

The method of the present invention in producing electrically conducting coatings on vitreous substances provides uniform, clear, conductive films on impervious surfaces of solids, inner surfaces of glass tubes, or other glass containers. By impervious surfaces as used herein and in the claims is meant one which is non-porous or substantially so, for example, vitreous solids, such as glass and fused quartz, vitreous-surfaced solids, such as glazed ceramics, and natural materials of little or no porosity, such as mica and quartz.

In carrying forth the practice of the present invention, a glass tube envelope or any other surface desired to be coated is held in an oven at near annealing temperature and a true aerosol for example the product resulting when methyl alcohol vapors in an air stream and vapors of tin tetrachloride in an air stream are merged in a chamber and passed through the tube surface or over the surface to be coated. The temperature of operation is determined by the particular material which is being coated wherein the material is held at near annealing temperature. The aerosol mixture is passed through the tube envelope or over the surface to be coated at the flow rate of more than the order of 1 cubic centimeter of air per second for each 1000 square centimeters of surface to be coated. When the surface has been coated sufficiently the coated object is removed from the furnace at any desired time that the atmosphere would not be harmful to the object coated and at such time that the object has cooled sufficiently for handling.

The apparatus shown by illustration in the drawings is designed as a closed system with the exception of air inlets for supplying air streams into the system and an outlet for exhausting the air mixture or aerosol from the system. The system includes two separate sections for developing air-vapor mixtures which are fed into a common mixing chamber 11 where the air-vapor mixture of one section is mixed with the air-vapor mixture of the other section and directed as a true aerosol in one stream through an outlet and then directed through the glass tube, or container, or over the surface to be coated. One section includes a container or vessel 12 which as shown has the configuration resembling the well known Erlenmeyer flask and designed to hold a supply of a reducing organic liquid substance 13 such as methyl alcohol. The vessel has connected thereto an air inlet line 14 and an oppositely disposed outlet line 15. An air supply from an air pressure tank 16 is supplied through inlet line 14 and controlled by a valve 17. The air passes into the vessel through inlet line 14 and out through outlet line 15 which is joined with the mixing chamber 11 near the bottom thereof.

The other section includes a container or vessel 21 designed to hold a supply of liquid metal halide 20 which has connected therewith an air inlet tube 22 at the bottom thereof and an outlet tube 23 near the top thereof and above the level of the substance therein. The inlet tube 22 is connected with a pressurized air supply 24 which has a control valve 25 in the line to control the air pressure through the line. The pressurized air from supply 24 is bubbled through the liquid metal halide and collects the metal vapors to form an air-metal halide vapor mixture which is forced through the outlet tube 23 and into the mixing chamber 11. The mixing chamber has a centrally located tube 26 which extends into the mixing chamber to a point above that at which the air-vapor mixture from the alcohol chamber 12 enters the mixing chamber.

The air-alcohol vapor mixture mixes with the air-metal halide vapors into a true aerosol mixture and is then forced through the outlet tube 27 from the mixing chamber to be passed through the tube or container 28 to be coated which is maintained at near annealing temperature by any suitable well known furnace or oven 31. The aerosol is exhausted from the tube to be coated through a tube 32 connected thereto at the furnace or oven.

In operation of the system for carrying out the method of the present invention a reducing organic liquid substance such as methyl alcohol is poured into the container 12 such that the level of the alcohol is below the passage of air through the chamber. Chamber 21 is provided with a solution of tin tetrachloride or any other suitable solution for coating a surface. Assuming that the inner surface of a glass envelope is to be coated, the glass envelope 28 is connected in the system at the heating oven and brought to the proper temperature. Air from each of the pressurized tanks is passed through the respective containers or vessels. For the purposes of identification the air stream through the container 12 will be indicated as a first stream and the air stream through the container 21 will be indicated as a second stream. The air flow of the first stream is at least five times the air flow of the second and generally it is much greater than five times. The flow of air through chamber 12 collects the vapors from the methyl alcohol and carries the vapors with the air stream into the mixing chamber 11. Simultaneous therewith the second air stream enters the bottom of the chamber 21 and is bubbled through the tin tetrachloride solution where the tin tetrachloride vapor is mixed with the air stream. Thence the mixture passes through tube 23 and merges with the air-methyl alcohol vapors in the mixing chamber 11 in the portion above the end of tube 25 to form a true aerosol. Dense white fumes are formed where the tin tetrachloride vapors mix with the alcohol vapors and these are forced rapidly over the hot glass surface to coat it with an electrically conducting coating which is of uniform thickness and photographically clear. The apparatus is operated at room temperature with exception of the furnace and the methyl alcohol is to be held at room temperature, for this purpose, a thermometer 33 is shown inserted into the chamber in which the methyl alcohol is located. For best results, the air methyl alcohol vapor-tin tetrachloride vapor mixture is forced through the tube envelope to be coated at a flow rate of more than the order of 1 cubic centimeter of the mixture per second for each 1000 square centimeters of surface to be coated. It is important for best results that the merged vapor air streams not be allowed to remain in contact with the hot surface to be coated for a long time. It has been determined that temperatures lower than just below annealing point are permissable however, at the lower temperatures the coating process takes a longer time than at the higher temperatures.

The above described method of this invention has been carried out in applying conductive coatings on tubes as used with betatrons and the electron synclotrons and have been used with the elongated cylindrical tubes as well as spherical tubes.

FIG. 2 illustrates a modification of the apparatus shown by illustration in FIG. 1. In the device illustrated by FIG. 2, the pressurized air is removed from the inlet to the chamber within which the methyl alcohol is placed and the inlet line 34 to the vessel 12 is made large with comparison to the inlet tube 14 through which the pressurized air enters the vessel. Also, the apparatus as modified includes an exhaust fan 35 for drawing the air-vapor mixtures or aerosol through the lines and over the surface to be coated. As shown, the furnace 36 is relatively large to include a larger tube 37. This apparatus is best used for larger tube surfaces which require an exhaust fan to draw the aerosol through the apparatus and over the surface to be coated. The operation of the apparatus as modified is substantially the same as for the apparatus shown and described in FIG. 1 except that the aerosol is drawn through the lines by the exhaust fan rather than being forced through the lines by the pressurized air. The inlet tube to the methyl alcohol vessel is made large such that sufficient atmospheric air can be drawn over the methyl alcohol to carry out the intended coating. After the aerosol has been drawn over the surface to be coated for a sufficient time to coat the surface as desired, the furnace is shut down and the coated surface is removed at such time that the surface which has been coated will not be effected by handling or by the atmosphere. The time at which the coated object can be removed depends on the material that was coated and not on the coating.

Obviously many modifications and variations of the present invention are possible in the light of the above teachings. It is therefore to be understood that within the scope of the appended claims the invention may be practiced otherwise than as specifically described.

What is claimed is:

1. A method for producing a clear, uniform, electrically conducting coating on an impervious surface which comprises mixing a first air stream with the vapors from a reducing organic liquid substance, forcing a second air stream through a chamber of liquid metal halide, combining said first air stream mixture with said second air stream mixture to form a true aerosol, forcing the aerosol stream mixture along and parallel with the impervious surface to be coated, and maintaining the impervious surface at a temperature sufficient to cause deposition from the aerosol and formation of a conductive film thereon.

2. A method for producing clear, uniform, electrically conducting coatings on an impervious surface which comprises mixing a first air stream with vapors of methyl alcohol, bubbling a second air stream through a container of tin tetrachloride, mixing said first air stream and methyl alcohol vapors with said second air stream and tin tetrachloride vapors to form a true aerosol, flowing the aerosol along and parallel with the impervious surface, and maintaining the surface at a temperature sufficient to cause deposition from the aerosol and formation of the film thereon.

3. A method for producing a clear, uniform, electrically conducting coating on the inner surface of a tube of heat resistant material which comprises mixing a first air stream with vapors of methyl alcohol, bubbling a second air stream through a container of tin tetrachloride, mixing said first air stream-methyl alcohol vapors with said second air stream-tin tetrachloride vapors to form a true aerosol, flowing the aerosol over the inner surface of said tube parallel with the axis thereof, and maintaining the surface at a temperature near annealing temperature which is sufficient to cause deposition from the aerosol and formation of the film on said surface.

4. The method defined in claim 3 wherein the aerosol flows through the tube at a flow rate of more than the order of 1 cubic centimeter per second for each 1000 square centimeters of surface to be coated.

5. A method for producing clear, uniform, electrically conducting coatings on the inner surface of a tube which comprises passing a first air stream over absolute methyl alcohol to provide an air-methyl alcohol vapor mixture, passing said methyl alcohol-air mixture into a mixing chamber, simultaneously passing a second air stream through a solution of tin tetrachloride to provide a tin tetrachloride vapor-air mixture, feeding said tin tetrachloride vapor-air mixture into said mixing chamber, said methyl alcohol vapor-air mixture mixing with said tin tetrachloride vapor-air mixture in said mixing chamber, flowing the combined mixture over the inner surface of said tube parallel with the axis thereof, and maintaining said tube at a temperature sufficient to cause deposition from the aerosol mixture and formation of the film thereon.

6. The method as defined in claim 5 wherein the rate of flow of said first stream is more than about five times the rate of flow of the second stream.

7. The method as defined in claim 6 wherein the air-vapors merged in said mixing chamber flows through the tube at the rate of the order of 1 cubic centimeter per second for each 1000 square centimeters of surface to be coated.

8. A method for producing clear, uniform, electrically conducting coatings on the inner surface of a glass tube which comprises heating said glass tube to near annealing temperatures and maintaining the temperature constant during coating, passing an air under pressure across a reducing organic liquid substance in a chamber to mix vapors of the organic liquid substance with the air, passing said organic liquid substance vapor-air mixture into a mixing chamber, simultaneously bubbling an air under pressure through a chamber containing a liquid metal halide to form a liquid metal halide vapor-air mixture, passing said liquid halide vapor-air mixture into said mixing chamber where the organic liquid substance vapor-air mixture mixes with said liquid metal halide vapor-air mixture to form a true aerosol, passing said aerosol through said tube to be coated parallel with the axis thereof and exhausting the aerosol into the atmosphere.

9. A method for producing coatings on the inner surface of a glass tube as claimed in claim 8 wherein said reducing organic liquid substance is methyl alcohol and said liquid metal halide is tin tetrachloride.

10. An apparatus for applying a conductive coating onto a surface which comprises a first chamber within which a reducing organic liquid substance is placed, a second chamber within which a liquid metal halide is placed, means for connecting said first and second chambers to a mixing chamber to provide a fluid flow from said first and second chambers into said mixing chamber, a heating furnace, means for directing a mixed fluid from said mixing chamber to said furnace, means for exhausting said fluid flow from said furnace and separately means for supplying an air flow respectively to said first and second chambers.

11. An apparatus as claimed in claim 10 wherein said air supply is directed across said first chamber above the liquid therein and perpendicular to the axis thereof and the air flow through said second chamber is directed through the liquid therein parallel with the axis from the bottom toward the top thereof.

References Cited in the file of this patent

UNITED STATES PATENTS

| | | |
|---|---|---|
| 2,556,711 | Teal | June 12, 1951 |
| 2,617,741 | Lytle | Nov. 11, 1952 |
| 2,698,812 | Schladitz | Jan. 4, 1955 |
| 2,759,855 | Medcalf et al. | Aug. 21, 1956 |
| 2,831,784 | Gastinger | Apr. 22, 1958 |
| 2,885,310 | Olson et al. | May 5, 1959 |
| 2,930,712 | Homer et al. | Mar. 29, 1960 |

FOREIGN PATENTS

| | | |
|---|---|---|
| 1,030,471 | Germany | May 22, 1958 |
| 564,733 | Canada | Oct. 14, 1958 |